(12) United States Patent
Chang

(10) Patent No.: US 12,122,912 B2
(45) Date of Patent: Oct. 22, 2024

(54) COMPOSITION COMPRISING MALEIMIDE PRE-POLYMERIZED RESIN

(71) Applicant: Elite Material Co., Ltd., Taoyuan (TW)

(72) Inventor: Shu-Hao Chang, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 552 days.

(21) Appl. No.: 17/557,846

(22) Filed: Dec. 21, 2021

(65) Prior Publication Data

US 2023/0135428 A1    May 4, 2023

(30) Foreign Application Priority Data

Nov. 4, 2021   (TW) .................................. 110141221

(51) Int. Cl.
| | |
|---|---|
| C08L 71/12 | (2006.01) |
| B32B 5/02 | (2006.01) |
| B32B 5/26 | (2006.01) |
| B32B 15/04 | (2006.01) |
| B32B 15/20 | (2006.01) |
| C08J 5/24 | (2006.01) |
| C08L 79/08 | (2006.01) |
| C09J 7/30 | (2018.01) |
| C09J 171/12 | (2006.01) |

(52) U.S. Cl.
CPC .............. *C08L 71/12* (2013.01); *B32B 5/02* (2013.01); *B32B 5/26* (2013.01); *B32B 15/043* (2013.01); *B32B 15/20* (2013.01); *C08J 5/244* (2021.05); *C08L 79/085* (2013.01); *C09J 7/30* (2018.01); *C09J 171/12* (2013.01); *B32B 2260/021* (2013.01); *B32B 2260/046* (2013.01); *B32B 2262/101* (2013.01); *B32B 2307/206* (2013.01); *C08J 2371/12* (2013.01); *C08J 2479/08* (2013.01); *C09J 2400/14* (2013.01); *C09J 2400/163* (2013.01); *C09J 2471/00* (2013.01); *C09J 2479/08* (2013.01)

(58) Field of Classification Search
CPC ...... C08L 71/12; C08L 71/126; C08L 79/085; B32B 2371/00; C08J 2371/12; C08J 2479/08

See application file for complete search history.

(56) References Cited

U.S. PATENT DOCUMENTS

2019/0016874 A1*  1/2019  Hsieh .................... C08L 79/085

* cited by examiner

*Primary Examiner* — Kregg T Brooks
(74) *Attorney, Agent, or Firm* — Maschoff Brennan

(57) ABSTRACT

The present invention provides a resin composition comprising maleimide-containing pre-polymerized resin and article made therefrom. The resin composition comprises: 100 weight parts of vinyl-containing polyphenylene ether resin; 35 to 45 weight parts of bis(vinylphenyl)ethane; and 30 to 60 weight parts of maleimide-containing pre-polymerized resin; wherein the maleimide-containing pre-polymerized resin is obtained by pre-polymerization of aromatic maleimide resin and long chain maleimide resin. The articles made from the resin composition improve at least one characteristic of glass transition temperature variation, copper foil peeling strength, percentage of thermal expansion, coefficient of thermal expansion and surface appearance.

9 Claims, 1 Drawing Sheet

COMPOSITION COMPRISING MALEIMIDE PRE-POLYMERIZED RESIN

CROSS-REFERENCE TO RELATED APPLICATION

This non-provisional application claims priority under 35 U.S.C. § 119(a) to Patent Application No. 110141221 filed in Taiwan, R.O.C. on Nov. 4, 2021, the entire contents of which are hereby incorporated by reference.

BACKGROUND

Technical Field

The present invention mainly relates to a resin composition and article made therefrom, in particular to a resin composition comprising maleimide-containing pre-polymerized resin and article made therefrom, which can be used to prepare resin films, prepregs, laminates or printed circuit boards and other products.

Related Art

Low-dielectric resin materials are important basic materials in the electronics industry, and are widely used in various electronic products such as servers, large base stations, and cloud devices.

In recent years, electronic technology is moving towards higher density, lower power consumption and higher performance, and therefore there are higher requirements for low-dielectric resin materials. With the high integration of electronic components per unit area, electronic components generate more and more heat during operation, especially in extremely harsh environment such as high temperature and high humidity. Hence, there are the higher requirements for the glass transition temperature of low-dielectric resin materials in this environment. Furthermore, in order to improve the interconnectivity and installation reliability of electronic components, the resin material needs to have a lower percentage of thermal expansion to ensure that the resin material has a higher dimensional stability, and facilitates the subsequent smooth positioning of the printed circuit board during the processing of the printed circuit board. At the same time, the resin material also needs to have sufficient adhesion to ensure that it can be tightly bonded to the metal circuit and is not peel off due to the drop of the metal circuit. In this way, the need of low-dielectric resin material applied to printed circuit board is satisfied.

Prior art low-dielectric resin materials use unsaturated polyphenylene ether resin to add into maleimide resin and bis(vinylphenyl)ethane to solve the problem of low glass transition temperature, large coefficient of thermal expansion and insufficient heat resistance. However, if the unsaturated polyphenylene ether resin is added with bis(vinylphenyl) ethane and aromatic maleimide resin, the dry board of substrate will occur, the copper foil peeling strength will be too low, and the problem of insufficient heat resistance will be generated due to the excessive reaction. If the long-chain maleimide resin is added instead, there will be problems such as a large coefficient of thermal expansion, a large percentage of thermal expansion, and insufficient heat resistance.

SUMMARY

In view of the problems encountered in the prior art, the main purpose of the present invention is to provide a resin composition comprising maleimide-containing pre-polymerized resin (That is, the composition comprising maleimide pre-polymerized resin referred to in the name of the present invention) and article made therefrom, which are prepared by pre-polymerizing the aromatic maleimide resin and the long-chain maleimide resin to form maleimide pre-polymerized resin, mixed with appropriate parts by weight thereof, and then mixed with vinyl-containing polyphenylene ether resin and bis(vinylphenyl)ethane to form the resin composition comprising maleimide-containing pre-polymerized resin and article made therefrom to solve at least one of the above-mentioned prior technical problems.

Specifically, the article of the resin composition comprising maleimide-containing pre-polymerized resin provided by the present invention can improve at least one characteristic of the glass transition temperature variation, the copper foil peeling strength, the percentage of thermal expansion, the coefficient of thermal expansion and the surface appearance.

The resin composition comprising maleimide-containing pre-polymerized resin of the present invention comprises: 100 parts by weight of vinyl-containing polyphenylene ether resin; 35 to 45 parts by weight of bis(vinylphenyl) ethane; and 30 parts by weight to 60 parts by weight of maleimide pre-polymerized resin; wherein the maleimide pre-polymerized resin is a prepolymer obtained by pre-polymerization of aromatic maleimide resin and long-chain maleimide resin, and wherein the long-chain maleimide resin comprises a structure shown in any one of formula (1) to formula (4);

formula (1)
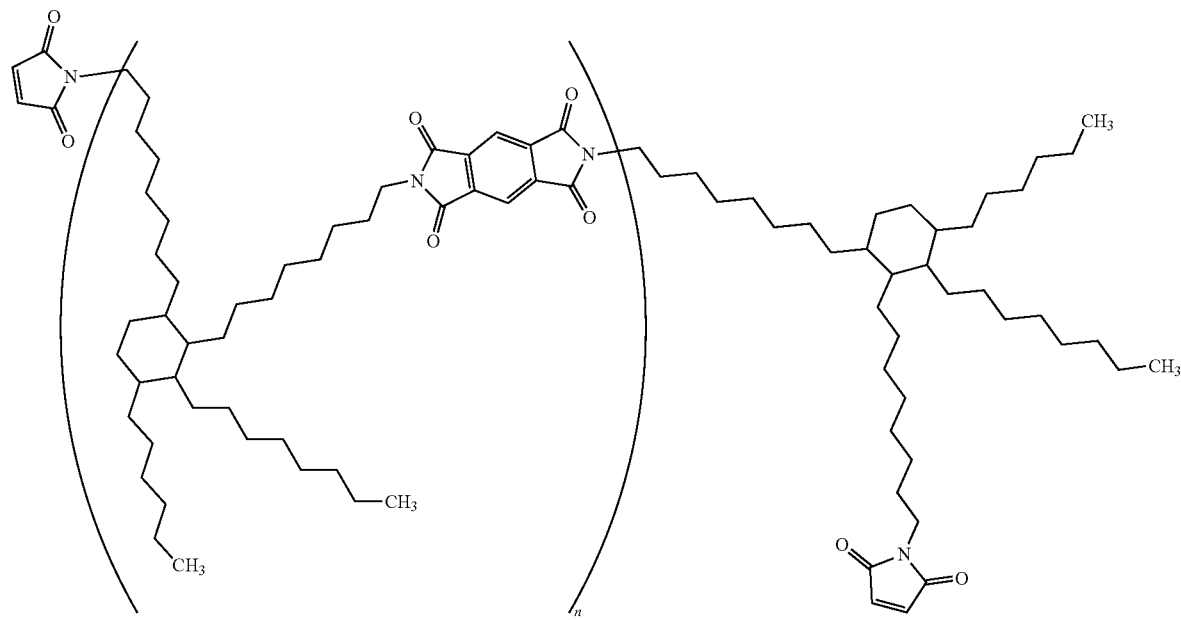
formula (2)
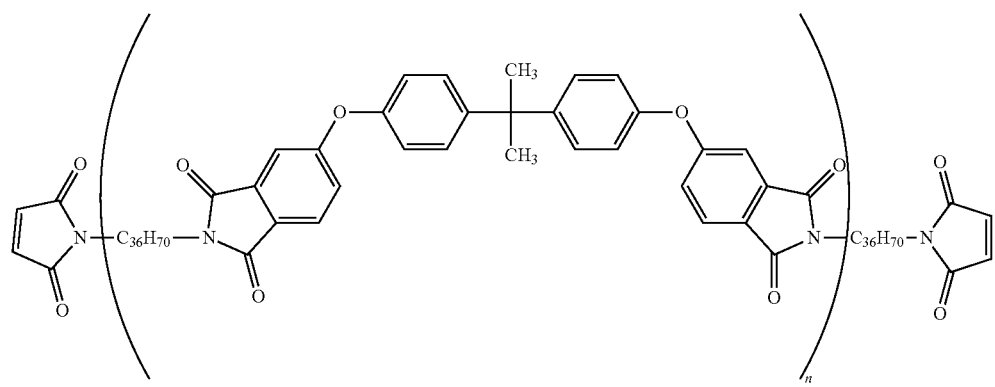
formula (3)
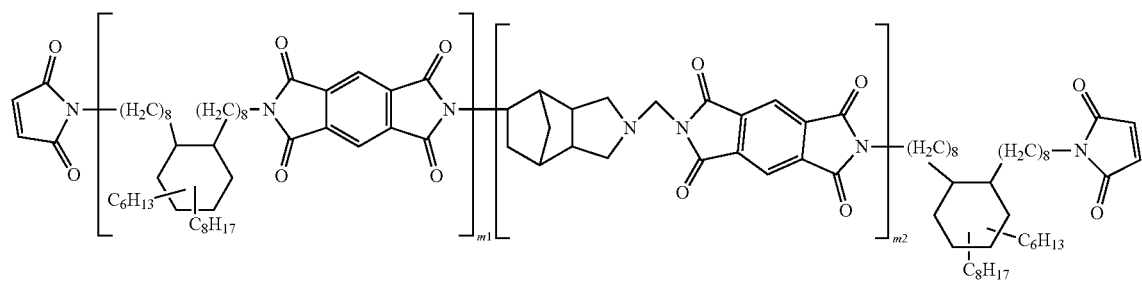
formula (4)
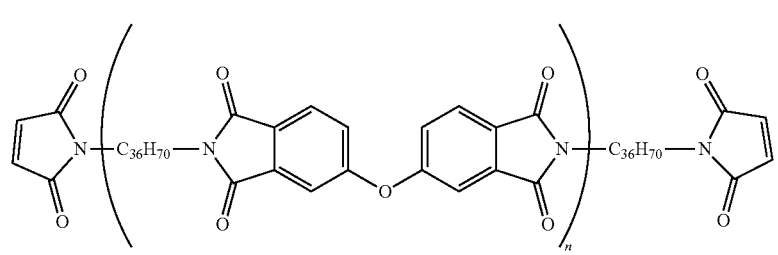

Wherein, in formula (1) and formula (2), n is an integer from 1 to 10 respectively; in formula (3), ml is an integer from 1 to 5, and m2 is an integer from 1 to 5; in formula (4)), n is an integer from 1 to 3; and wherein the weight ratio of the aromatic maleimide resin to the long-chain maleimide resin is 1:3 to 1:5.

The resin composition comprising maleimide-containing pre-polymerized resin of the present invention, wherein the vinyl-containing polyphenylene ether resin comprises methacrylate-containing polyphenylene ether resin, vinylbenzyl-containing biphenyl polyphenylene ether resin, vinylbenzyl-containing bisphenol A polyphenylene ether resin, chain-extended vinyl-containing polyphenylene ether resin, or a combination thereof.

The resin composition comprising maleimide-containing pre-polymerized resin of the present invention, wherein the aromatic maleimide resin comprises bis (3-ethyl-5-methyl-4-maleimidephenyl) methane, bisphenol A diphenyl ether bismaleimide, polyphenylmethane maleimide and 4,4'-diphenylmethane bismaleimide, or a combination thereof.

In one embodiment, the resin composition comprising maleimide-containing pre-polymerized resin of the present invention, further comprises flame retardant, crosslinking agent, inorganic filler, curing accelerator, solvent, polymerization inhibitor, silane coupling agent, coloring agent, toughening agent, core-shell rubber or a combination thereof.

The resin composition comprising maleimide-containing pre-polymerized resin of the present invention comprises: resin film, prepreg, laminate or printed circuit board.

The article of resin composition comprising maleimide-containing pre-polymerized resin of the present invention, is measured with reference to the method described in IPC-TM-650 2.4.24.4, and its glass transition temperature variation is less than or equal to 3° C.

The article of resin composition comprising maleimide-containing pre-polymerized resin of the present invention, is measured with reference to the method described in IPC-TM-650 2.4.8, and its copper foil peeling strength is greater than or equal to 3.2 lb/in.

The article of resin composition comprising maleimide-containing pre-polymerized resin of the present invention, is measured with reference to the method described in IPC-TM-650 2.4.24.5, and its percentage of thermal expansion of Z-axis is less than or equal to 2.5%.

The article of resin composition comprising maleimide-containing pre-polymerized resin of the present invention, is measured with reference to the method described in IPC-TM-650 2.4.24.5, and its coefficient of thermal expansion of the Z axis is less than or equal to 45 ppm/° C.

The article of resin composition comprising maleimide-containing pre-polymerized resin of the present invention, passes the visual inspection test of appearance, and has non-dry board and non-weave phenomenon, and its appearance is normal.

DETAILED DESCRIPTION

Figure 1:
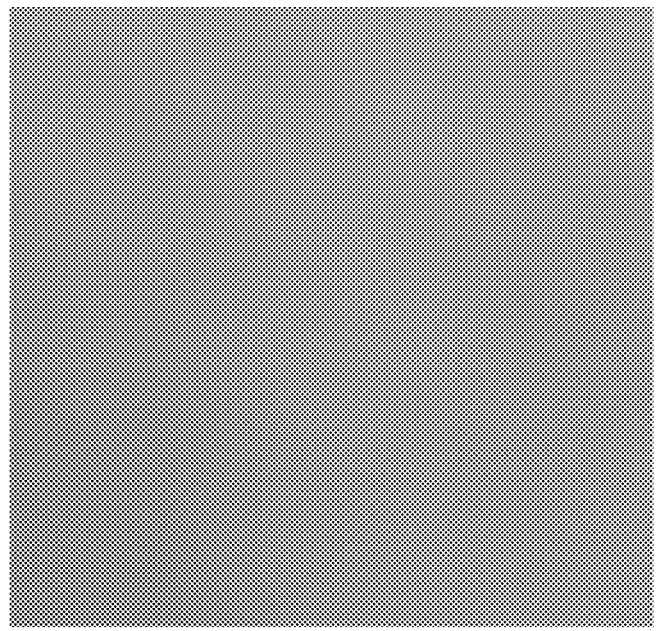
FIG. 1 is a phenomenon that the appearance is normal and there is non-dry board and non-weave pattern, and the test result is "OK".

In order to enable a person having ordinary skill in the art to understand the characteristics and effects of the present invention, the following general descriptions and definitions are made on the terminologies and terms mentioned in the specification and the scope of the patent application. Unless otherwise specified, all technical and scientific terms used in the article have the usual meanings as understood by a person having ordinary skill in the art for the present invention. In case of conflict, the definition in this specification shall prevail.

The theory or mechanism described and disclosed herein, whether right or wrong, should not limit the scope of the present invention in any way, that is, the content of the present invention can be implemented without being restricted by any specific theory or mechanism.

This article uses "a", "an", "a kind of" or similar expressions to describe the components and technical characteristics of the present invention. Such description is only for the convenience of expression and provides a general meaning to the scope of the present invention. Therefore, this description should be understood to include one or at least one, and the singular number also includes the plural number, unless it clearly indicates other meanings.

In this article, "or its combination" means "or any combination thereof", "any a", "any kind of", "any" means "any a", "any kind of", "any one".

In this article, the terms "including", "comprising", "having", "containing" or any other similar terms are all open-ended transitional phrases, which are intended to cover and non-exclusive inclusions. For example, a composition or article containing plural elements is not limited to the elements listed herein, but may also include other elements that are not explicitly listed but are generally inherent in the composition or article. In addition, unless expressly stated to the contrary, the term "or" refers to the inclusive "or" rather than the exclusive "or". For example, any one of the following conditions meets the condition "A or B": A is true (or exists) and B is false (or does not exist), A is false (or does not exist) and B is true (or exists), A and B are both true (or exist). In addition, in this article, the interpretation of the terms "including", "comprising", "having", and "containing" shall be deemed to have been specifically disclosed and cover "consisting of" and "consisting essentially of" and other closed or semi-open transitional phrases.

In this article, if there are features or conditions defined in the form of numerical ranges or percentage ranges, it is only for brevity and convenience. Accordingly, the description of the numerical range or the percentage range should be regarded as covering and specifically revealing all possible sub-ranges and individual values within the range, especially for integer values. For example, the description of the range of "1 to 8" should be deemed to have specifically disclosed all sub-ranges such as 1 to 7, 2 to 8, 2 to 6, 3 to 6, 4 to 8, 3 to 8, etc., especially for the sub-range defined by all integer values, which should be regarded as individual values such as 1, 2, 3, 4, 5, 6, 7, and 8 within the specifically disclosed range. In the same way, the description of the range of "between 1 to 8" should be deemed to have been specifically disclosed such as 1 to 8, 1 to 7, 2 to 8, 2 to 6, 3 to 6, 4 to 8, 3 to 8, etc., and endpoint values included. Unless otherwise specified, the foregoing interpretation method is applicable to all contents of the full article of the present invention, regardless of its broad scope or not.

If a quantity or other value or parameter is expressed in terms of a range, a preferred range or a series of upper and lower limits, it should be understood that this article has specifically disclosed that the all ranges constituted by the upper limit or preferred value of the range, and the lower limit or the preferred value of the range, regardless of whether the ranges are separately disclosed. In addition, when a numerical range is mentioned in this article, unless otherwise specified, the range shall include its endpoints and all integers and fractions within the range.

In this article, on the premise that the purpose of the invention can be achieved, a value should be understood to have the accuracy for significant digits of the number. For example, the number 40.0 should be understood to cover the range from 39.50 to 40.49.

In this article, if there is a situation where Markush group or option terms are used to describe the features or embodiments of the present invention, a person having ordinary skill in the art should understand sub-groups of all members or any individual member in the Markush group or option list, which can also be used to describe the invention. For example, if X is described as "selected from the group consisting of X1, X2 and X3", it also means that the claims of X is X1 and X is X1 and/or X2 and/or X3, which have been fully described. Furthermore, the Markush group or option list is used to describe the features or embodiments of the present invention, a person having ordinary skill in the art should understand that any combination of the sub-groups or individual member of all members in the Markush group or the option list also can be used to describe the present invention. Accordingly, for example, if X is described as "selected from the group consisting of X1, X2, and X3", and Y is described as "selected from the group consisting of Y1, Y2, and Y3", it means that the claims of X is X1 or X2 or X3 and Y is Y1 or Y2 or Y3 has been fully described.

In the present invention, unless otherwise specified, a compound refers to a chemical substance formed by connecting two or more elements through a chemical bond, including small molecule compounds and polymer compounds, and is not limited thereto. The compound may include monomer and polymer forms, but is not limited thereto. The interpretation of compounds in this article is not limited to a single chemical substance, but can also be interpreted as the same type of chemical substance with the same composition or with the same properties.

In the present invention, unless otherwise specified, a monomer refers to a polymer molecule formed by the molecules of the same or another species linked covalently.

In the present invention, unless otherwise specified, a polymer refers to a product formed by a polymerization reaction of monomers, which often includes aggregates of many macromolecules, and each macromolecule is formed by many simple structural units connected repeatedly by covalent bonds, the monomer is a compound that synthesizes the polymer. The polymer may include homopolymers (also called self-polymers), copolymers, prepolymers, etc., and is not limited thereto. Prepolymer is a chemical substance produced by the polymerization reaction of monomers with a conversion rate between 10% and 90%. The polymer of course includes oligomers, and is not limited thereto. Oligomer is also called lowmolecular weight polymers, it is composed of 2 to 20 repeating units and it has usually 2 to 5 repeating units. For example, the interpretation of diene polymers includes diene homopolymers, diene copolymers, diene prepolymers, and diene oligomers, etc.

In this article, prepolymer refers to a product, which still contains reactive functional groups or has polymerization potential after pre-polymerization (partial polymerization) reaction of the compound or mixture (monomer). For example, the molecular weight or viscosity can be used to help confirm whether the reaction degree of the pre-polymerization reaction meets the requirements. The pre-polymerization method used herein, for example, but not limited to, using a solvent to raise temperature to initiate the pre-polymerization reaction, or using a thermal melting reaction to initiate the pre-polymerization reaction. For example, the solvent heating pre-polymerization is to add the raw materials to the solvent to dissolve, and optionally add a catalyst or polymerization inhibitor as needed, and then perform a heating reaction after all the raw materials are dissolved in the solvent to initiate the pre-polymerization reaction. The thermal melting reaction pre-polymerization is to directly heat and melt the raw materials to initiate the pre-polymerization reaction. The pre-polymerized product (prepolymer) has a larger molecular weight than the un-pre-polymerized compound monomer or mixture monomer, and can be analyzed by Gel Permeation Chromatograph (GPC). The results of the residence time (X-axis) and molecular weight (Y-axis) distribution graphs show that the molecular weight distribution peak of the prepolymer is located at the front end (shorter residence time), while the molecular weight distribution peak of the monomer is located at the back end (longer residence time). In addition, the obtained prepolymer has a broad molecular weight distribution peak that includes multiple peaks continuously connected. In contrast, the monomer has a narrower molecular weight distribution peak and only includes a single molecular weight distribution peak.

For a person having ordinary skill in the art, a resin composition containing three compounds of A, B and C and one additive (contains four components in total), and another resin composition containing a prepolymer formed by three compounds of A, B and C, and an additive (contains a total of two components), both are different resin compositions. Both are completely different in many aspects, such as the preparation method, their physical and chemical properties, and the characteristics of their articles. For example, the former is to mix A, B, C and additives to form a resin composition, and the latter is to pre-polymerize the mixture including A, B, and C under appropriate conditions to form a prepolymer, and then the prepolymer is mixed with additive to prepare the resin composition. For example, for a person having ordinary skill in the art, the aforementioned two resin compositions have completely different compositions, and because the function of the prepolymer formed by the three compounds of A, B and C in the resin composition is completely different from the function of A, B and C in the resin composition individually or together, the two resin compositions should be regarded as completely different chemical substances with completely different chemical statuses. For example, for a person having ordinary skill in the art, since the aforementioned two resin compositions are completely different chemical substances, their articles will not have the same characteristics. For example, a resin composition includes a prepolymer formed by three compounds of A, B and C and a crosslinking agent. Because A, B and C have been partially reacted or transformed during the pre-polymerization reaction to form a prepolymer, therefore, when the resin composition is heated at a high temperature to form a semi-cured state, a partial crosslinking reaction between the prepolymer and the crosslinking agent occurs, instead of the partial crosslinking of A, B, and C with the crosslinking agent. Therefore, the articles formed by the two resin compositions will be completely different and have completely different characteristics.

In the present invention, unless otherwise specified, "resin" can generally be a customary name for synthetic polymers, but in the present invention, when interpreting "resin", it can include monomers and their combination, polymers and their combination, or combination of monomers and their polymers, etc., but not limited thereto. A combination of monomers is a group formed by multiple monomers. A combination of monomers is a group formed by a plurality of monomers. For example, in the present invention, "maleimide resin" includes maleimide monomers, maleimide polymers, the combinations of maleimide monomers, the combination of the maleimide polymers, and the combination of the maleimide monomers and the maleimide polymers. The resin may include compounds and mixtures. The compound includes monomers or polymers. The mixture includes two or more compounds, and the mixture may also include copolymers or other auxiliary agents, etc., but not limited thereto. For example, the resin may include a combination of monomers. A combination of monomers is a group formed by multiple monomers.

In the present invention, for example, "vinyl-containing" when interpreted includes vinyl group, vinylidene group, allyl group, (meth)acrylate group or a combination thereof.

In the present invention, unless otherwise specified, specific embodiments of acrylate compounds are written in the form of "(meth)acrylate". When interpreting, it should be understood to include the two situations that contains methyl groups and don't contain methyl groups. For example, cyclohexane dimethanol di(meth)acrylate should be interpreted as including cyclohexane dimethanol diacrylate, cyclohexane dimethanol dimethacrylate or both.

It should be understood that the features disclosed in the various embodiments herein can be combined arbitrarily to form the technical solution of the present application, as long as there is no contradiction in the combination of these features.

In this article, unless otherwise specified, parts by weight represent parts of weight, which can be any weight unit, such as, but not limited to, kilograms, grams, pounds and other weight units. For example, 100 parts by weight of maleimide resin means that it can be 100 kilograms of maleimide resin or 100 pounds of maleimide resin.

The following specific embodiments are merely illustrative, and are not intended to limit the present invention and its uses. In addition, this document is not limited by any theory described in the foregoing prior art or invention content or the following specific implementations or embodiments.

In one embodiment, the resin composition comprising maleimide-containing pre-polymerized resin of the present invention comprises: 100 parts by weight of vinyl-containing polyphenylene ether resin; 35 to 45 parts by weight of bis(vinylphenyl) ethyl ethane; and 30 parts by weight to 60 parts by weight of maleimide pre-polymerized resin; wherein the maleimide pre-polymerized resin is a prepolymer obtained by pre-polymerization of aromatic maleimide resin and long-chain maleimide resin, and wherein the long-chain maleimide resin comprises a structure shown in any one of formula (1) to formula (4);

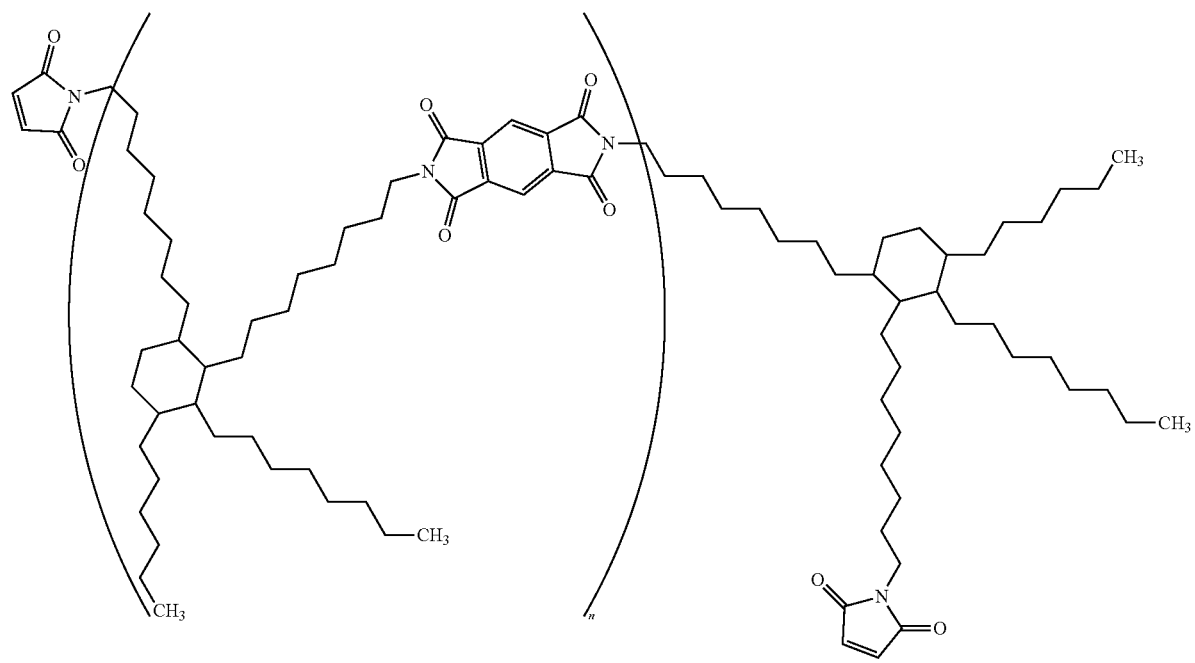

formula (1)

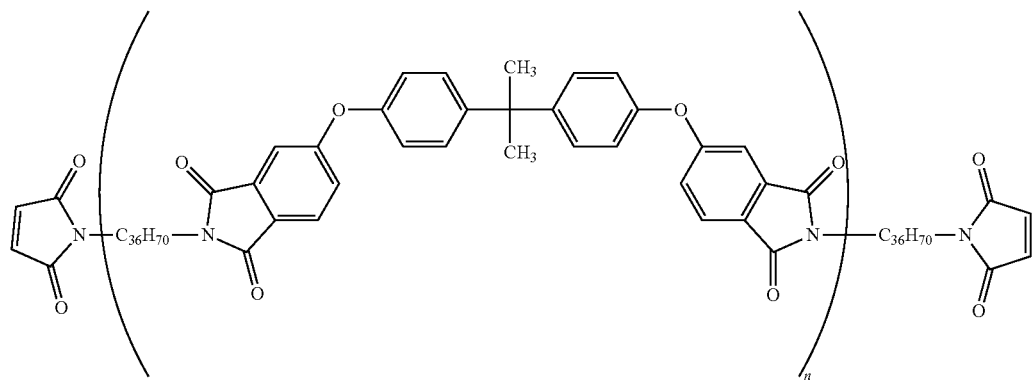

formula (2)

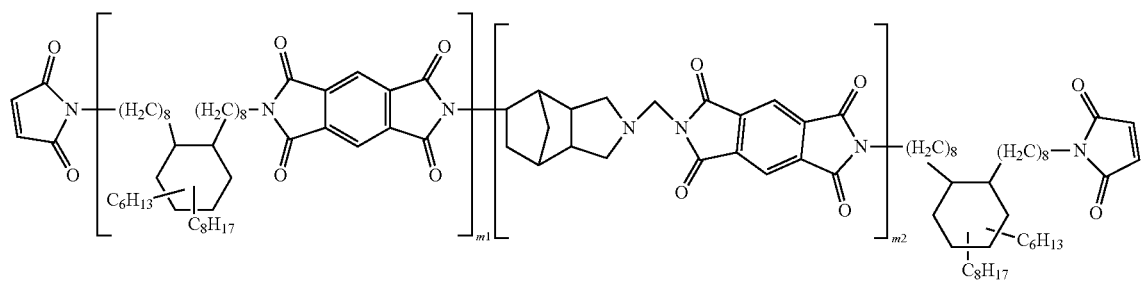

formula (3)

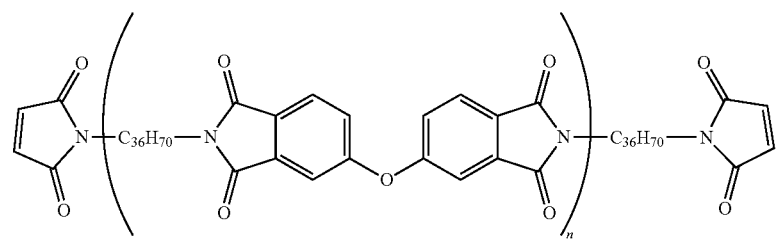

formula (4)

Wherein, in formula (1) and formula (2), n is an integer from 1 to 10 respectively; in formula (3), m1 is an integer from 1 to 5, and m2 is an integer from 1 to 5; in formula (4)), n is an integer from 1 to 3; and wherein the weight ratio of the aromatic maleimide resin to the long-chain maleimide resin is 1:3 to 1:5.

In one embodiment, the reaction conditions (i.e., pre-polymerization reaction) of the prepolymer of the present invention refer to that 10 parts by weight of aromatic maleimide resin and 30 parts by weight to 50 parts by weight of long-chain maleimide resin are added to an appropriate amount of solvent, and the mixture is stirred evenly at room temperature to dissolve the aromatic maleimide resin and the long-chain maleimide resin in the solvent to obtain a solution. The solution is heated to 100° C. to 150° C. and reacted for 30 minutes to 90 minutes to obtain the maleimide pre-polymerized resin of the present invention, and the solid content of the solution is between 50% and 70%. In the reaction process, 0.1 to 0.5 part by weight of curing initiator (such as but not limited to peroxide) can be added as needed. One of the characteristics of the present invention is to control the reaction conversion rate of the aromatic maleimide resin and the long-chain maleimide resin under appropriate conditions, so that the components partially react with each other, while the product still retains residual vinyl groups (i.e., unreacted vinyl groups). For example, after the pre-polymerization reaction, the reaction conversion rate of the maleimide pre-polymerized resin of the present invention may be between 10% and 90%.

In one embodiment, the vinyl-containing polyphenylene ether resin comprises methacrylate-containing polyphenylene ether resin, vinylbenzyl-containing biphenyl polyphenylene ether resin, vinylbenzyl-containing bisphenol A polyphenylene ether resin, chain-extended vinyl-containing polyphenylene ether resin, or a combination thereof.

For example, in one embodiment, the vinyl-containing polyphenylene ether resin may include various types of vinyl-containing polyphenylene ether resins known in the art. The vinyl-containing polyphenylene ether resin suitable of the present invention is not particularly limited, and can be any one or more of commercially available products, self-made products, or a combination thereof. In some embodiments, any one or more of the following vinyl-containing polyphenylene ether resins can be used: vinylbenzyl-containing biphenyl polyphenylene ether resin (such as OPE-2st, available from Mitsubishi Gas Chemical Co., Inc.), methacrylate-containing polyphenylene ether resin (such as SA9000, available from Sabic), vinylbenzyl-containing bisphenol A polyphenylene ether resin, chain-extended vinyl-containing polyphenylene ether resin, or a combination thereof. The chain-extended vinyl-containing polyphenylene ether resin may include various polyphenylene ether resins in the US Patent Application Publication No. 2016/0185904 A1, the entire content of which is incorporated herein by reference.

In one embodiment, wherein the aromatic maleimide resin comprises bis (3-ethyl-5-methyl-4-maleimidephenyl) methane, bisphenol A diphenyl ether bismaleimide, polyphenylmethane maleimide, 4,4'-diphenylmethane bismaleimide, or a combination thereof.

In one embodiment, the resin composition comprising maleimide-containing pre-polymerized resin of the present invention, further comprises flame retardant, crosslinking agent, inorganic filler, curing accelerator, solvent, polymerization inhibitor, silane coupling agent, coloring agent, toughening agent, core-shell rubber or a combination thereof.

For example, in one embodiment, compared to 100 parts by weight of the vinyl-containing polyphenylene ether resin, the content of any of the foregoing components may be 0.01 part by weight to 300 parts by weight, such as but not limited to 0.01 part by weight to 3 parts by weight, 30 parts by weight to 80 parts by weight, or 50 parts by weight to 300 parts by weight.

Unless otherwise specified, the flame retardant suitable for the present invention can be any one or more flame retardants suitable for the production of resin films, prepregs, laminates or printed circuit boards, such as but not limited to phosphorus-containing flame retardants. They preferably include: ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis (dixylenyl phosphate), RDXP (such as PX-200, PX-201, PX-202, and other commercial products), phosphazene compounds (phosphazene, such as SPB-100, SPH-100, SPV-100 and other commercial products), melamine polyphosphate, 9,10-dihydro-9-oxa-10-phosphenanthrene-10-oxide (DOPO) and its derivatives (such as di-DOPO compounds) or resins, diphenylphosphine oxide (DPPO) and its derivatives (such as di-DPPO compounds) or resins, melamine cyanurate, tri-hydroxyethyl isocyanurate, aluminum phosphinate (such as OP-930, OP-935, etc.) or combination thereof. Unless otherwise specified, it is indicated that the amount of the above flame retardant is not particularly limited.

For example, the flame retardant can be a DPPO compound (such as a di-DPPO compound), a DOPO compound (such as a di-DOPO compound), a DOPO resin (such as DOPO-HQ, DOPO-NQ, DOPO-PN, DOPO-BPN), DOPO-bonded epoxy resin, etc., wherein DOPO-PN is DOPO-containing phenol novolac resin, DOPO-BPN can be DOPO-BPAN (DOPO-bisphenol A novolac), DOPO-BPFN (DOPO-bisphenol F novolac) or DOPO-BPSN (DOPO-bisphenol S novolac) and other bisphenol novolac resins. Unless otherwise specified, the amount of the above flame retardant is not particularly limited.

For example, in an embodiment, the cross-linking agent suitable for the present invention may be various cross-linking agents known in the art for resin compositions, and it includes but not limited to triallyl isocyanurate, polyolefin, or a combination thereof. For example, compared to 100 parts by weight of vinyl-containing polyphenylene ether resin, in the resin composition of the present invention, the amount of the above-mentioned crosslinking agent is not particularly limited, and preferably may be 5 parts by weight to 15 parts by weight.

Unless otherwise specified, the amount of curing accelerator used in the present invention can be adjusted as needed. For example, compared to 100 parts by weight of vinyl-containing polyphenylene ether resin, in the resin composition of the present invention, the amount of the above-mentioned curing accelerator is not particularly limited, for example, it can be 0.01 part by weight to 0.5 part by weight or 0.1 part by weight to 1 part by weight.

For example, the above-mentioned curing accelerator (including curing initiator) may include a catalyst such as a Lewis base or a Lewis acid. Among them, the Lewis base can include imidazole, boron trifluoride amine complex, ethyltriphenyl phosphonium chloride, 2-methylimidazole (2MI), 2-phenyllmidazole (2-phenyl-1H-imidazole, 2PZ), 2-ethyl methylimidazole (2E4MI), triphenylphosphine (TPP), 4-dimethyl 4-dimethylaminopyridine (DMAP) or combination thereof. The Lewis acid may include metal salt compounds, such as manganese, iron, cobalt, nickel, copper, zinc and other metal salt compounds, such as zinc octoate, cobalt octoate and other metal catalysts. Curing accelerator also includes curing initiator, such as peroxide that can generate free radicals. Curing initiator includes but are not limited to: dicumyl peroxide, tert-butyl peroxybenzoate, dibenzyl peroxide (BPO), 2,5-dimethyl-2,5-di(tert-butylperoxy)-3-hexyne (25B), bis(tert-butylperoxyisopropyl) benzene or a combination thereof.

The polymerization inhibitor suitable for the present invention has the effect of inhibiting the polymerization reaction. Unless otherwise specified, the specific embodiments are not particularly limited, and it may include various molecular type polymerization inhibitors, stable free radical type polymerization inhibitors or combinations thereof known in the art. For example, molecular type polymerization inhibitors suitable for the present invention include, but are not limited to, phenol compounds, quinone compounds, aniline compounds, arene nitro compounds, sulfur-containing compounds, variable metal chlorides, or combinations thereof. More specifically, molecular type polymerization inhibitors suitable for the present invention include, but are not limited to, phenol, hydroquinone, 4-tert-butylcatechol, benzoquinone, chloroquinone, 1,4-naphthoquinone, trimethylquinone, aniline, nitrobenzene, $Na_2S$, $FeCl_3$, $CuCl_2$ or combination thereof. For example, the stable free radical type polymerization inhibitor suitable for the present invention includes, but is not limited to, 1,1-diphenyl-2-picrylhydrazyl radical (DPPH), triphenylmethyl radical or a combination thereof.

The main function of the solvent added in the present invention is to dissolve each component in the resin composition, change the solid content of the resin composition, and adjust the viscosity of the resin composition. For example, the solvent may include, but is not limited to, methanol, ethanol, ethylene glycol monomethyl ether, acetone, butanone (also known as methyl ethyl ketone), methyl isobutyl ketone, cyclohexanone, toluene, xylene, methoxyethyl acetate, ethoxyethyl acetate, propoxyethyl acetate, ethyl acetate, propylene glycol methyl ether, anisole, dimethylformamide, dimethylacetamide and N-methyl-pyrrolidone, or mixed solvents thereof. The amount of the aforementioned solvent is not particularly limited, and the amount of solvent added can be adjusted according to the required viscosity of the resin composition.

Unless otherwise specified, the inorganic fillers suitable for the present invention can be any one or more of inorganic fillers suitable for the production of resin films, prepregs, laminates or printed circuit boards. Specific embodiments include but are not limited to: silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, ammonium molybdate, zinc molybdate modified talc, zinc oxide, zirconium oxide, mica, boehmite (AlOOH), calcined talc, talc, silicon nitride or calcined kaolin. In addition, the inorganic filler can be spherical, fibrous, plate-like, particulate, sheet-like or whisker-like, and can be optionally pretreated with a silane coupling agent if necessary.

Unless otherwise specified, the silane coupling agent suitable for the present invention may include silane compounds (silane, such as but not limited to siloxane compounds), which can be further divided into amino silane compounds (amino silane), epoxy silane compound (epoxide silane), vinyl silane compound, ester silane compound, hydroxy silane compound, isocyanate silane compound, methacryloxysilane compound and acryloxysilane compound according to the types of functional groups. The amount of the aforementioned silane coupling agent is not particularly limited, and the addition amount of the silane coupling agent can be adjusted depending on the dispersibility of the inorganic filler of the resin composition.

Unless otherwise specified, coloring agent suitable for use in the present invention may include, but are not limited to, dyes or pigments.

The main effect of adding a toughening agent in the present invention is to improve the toughness of the resin composition. Unless otherwise specified, the toughening agent suitable for the present invention may include, but is not limited to, carboxyl-terminated butadiene acrylonitrile rubber (CTBN) and other rubbers.

In one embodiment, the article of the resin composition comprising maleimide-containing pre-polymerized resin of the present invention includes: a resin film, a prepreg, a laminate or a printed circuit board.

For example, the resin composition of the present invention can be made into a resin film.

For example, in one embodiment, the resin film of the present invention is formed by baking and heating the resin composition to a semi-cured state. For example, the resin composition can be selectively coated on liquid crystal resin film, polyethylene terephthalate film (PET film) or polyimide film, and then it is heated and baked to a semi-cured state at an appropriate temperature to form a resin film. For another example, the resin composition of each embodiment of the present invention can be respectively coated on copper foil to make the resin composition uniformly adhered, and then it is heated and baked to a semi-cured state at an appropriate temperature to obtain a resin film. The resin film on the copper foil can also be called resin coated copper.

For example, the resin composition of the present invention can be made into a prepreg.

For example, in one embodiment, the prepreg of the present invention has a reinforcing material and a layered material disposed on the reinforcing material, and the layered material is heated to a semi-cured state (B-stage) from the aforementioned resin composition at a high temperature. The baking temperature for preparing the prepreg is, for example, between 130° C. and 150° C. The reinforcing material may be a fibrous material or a non-fibrous material, the form of the reinforcing material may be any one of woven fabric and non-woven fabric, and the woven fabric preferably includes fiberglass fabrics. The type of fiberglass fabrics is not particularly limited. It can be commercially available fiberglass fabrics that can be used for various printed circuit boards, such as E-glass fiber fabric, D-glass fiber fabric, S-glass fiber fabric, and T-glass fiber fabric, L-glass fiber fabric or Q-glass fiber fabric, the types of fibers include yarn and roving, etc., and their form can include spread form or standard form. The aforementioned non-woven fabric preferably includes a liquid crystal resin non-woven fabric, such as a polyester non-woven fabric, a polyurethane non-woven fabric, etc., and is not limited thereto. The aforementioned woven fabric may also include liquid crystal resin woven fabric, such as polyester woven fabric or polyurethane woven fabric, etc., and is not limited thereto. This reinforcing material can increase the mechanical strength of the prepreg. In a preferred embodiment, the reinforcing material can also be selectively pretreated with a silane coupling agent. After the prepreg is heated and cured (C-stage), an insulating layer will be formed.

For example, in one embodiment, the resin composition may be uniformly mixed to form a varnish, the varnish is placed in the impregnation tank, and then the fiberglass fabric is immersed in the impregnation tank to make the resin composition attached to the fiberglass fabric, and then it is heated and baked at an appropriate temperature to a semi-cured state to obtain a prepreg.

For example, the resin composition of the present invention can be made into a laminate.

For example, in one embodiment, the laminate of the present invention includes at least two metal foils and at least one insulating layer, the insulating layer is disposed between the two metal foils, and the insulating layer can be formed by the resin composition cured under high temperature and high pressure (C-stage). The applicable curing temperature is, for example, between 190° C. and 210° C., preferably between 195° C. and 205° C., and the curing time is 120 minutes to 180 minutes, preferably 150 minutes to 160 minutes, the applicable pressure is between 400 psi and 600 psi, preferably 500 psi. The aforementioned insulating layer can be obtained by curing the aforementioned prepreg or resin film. The material of the aforementioned metal foil can be copper, aluminum, nickel, platinum, silver, gold or alloys thereof, such as copper foil. In a preferred embodiment, the laminate is a copper foil substrate (also called a copper clad laminate).

For example, in one embodiment, the aforementioned laminate may be further processed into a printed circuit board through circuit processing.

For example, in one embodiment, one of the manufacturing methods of the printed circuit board of the present invention may be to use a double-sided copper-clad laminate (such as product EM-891, available from Elite Material Co., Ltd.) of HVLP (hyper very low profile) with a thickness of 28 mils and 0.5 ounce. It is drilled and electroplated, so that electrical conduction is formed between the upper copper foil and the bottom copper foil. Then the upper copper foil and the bottom copper foil are etched to form an inner layer circuit. Then, the inner layer circuit is browned oxidation and roughened to form an uneven structure on the surface to increase the roughness. Next, the copper foil, the aforementioned prepreg, the aforementioned inner layer circuit, the aforementioned prepreg, and the copper foil are sequentially stacked, and then heated at a temperature of 190° C. to 210° C. for 120 minutes to 180 minutes by using a vacuum laminating device to solidify the insulating layer material of the prepreg. Then, various circuit board manufacturing processes known in the art, such as black oxidation, drilling, and copper plating, are performed on the copper foil of the outermost surface to obtain a printed circuit board.

In one embodiment, the article of resin composition comprising maleimide-containing pre-polymerized resin of the present invention is measured with reference to the method described in IPC-TM-650 2.4.24.4, and its glass transition temperature variation is less than or equal to 3° C., for example, between 0° C. and 3° C.

In one embodiment, the article of resin composition comprising maleimide-containing pre-polymerized resin of the present invention is measured with reference to the method described in IPC-TM-650 2.4.8, and the copper foil peeling strength is greater than or equal to 3.2 lb/in, for example, between 3.2 lb/in and 3.5 lb/in.

In one embodiment, the article of resin composition comprising maleimide-containing pre-polymerized resin of the present invention is measured with reference to the method described in IPC-TM-650 2.4.24.5, and its percentage of thermal expansion of Z-axis is less than or equal to 2.5%, for example, between 2.3% and 2.5%.

In one embodiment, the article of resin composition comprising maleimide-containing pre-polymerized resin of the present invention is measured with reference to the method described in IPC-TM-650 2.4.24.5, and its coefficient of thermal expansion of Z-axis is less than or equal to 45 ppm/° C., for example, between 35 ppm/° C. and 45 ppm/° C.

In one embodiment, the article of resin composition comprising maleimide-containing pre-polymerized resin of the present invention has passed the visual inspection test of appearance, and has non-dry board and non-weave phenomenon, and its appearance is normal.

The chemical raw materials are used in the preparation embodiments of the maleimide pre-polymerized resin, and the embodiments of resin composition comprising maleimide-containing pre-polymerized resin and article made therefrom in the present invention, and comparative examples are as follows:

SA9000: Polyphenylene ether resin containing methacrylate, purchased from Sabic.

OPE-2st-1200: Polyphenylene ether resin containing vinylbenzyl, with a weight average molecular weight (Mw) of 1200, purchased from Mitsubishi Gas Chemical.

OPE-2st-2200: Polyphenylene ether resin containing vinylbenzyl, with a weight average molecular weight (Mw) of 2200, purchased from Mitsubishi Gas Chemical.

BVPE: Bis (vinyl phenyl) ethane, purchased from Linchuan Chemical.

BMI-70: Bis (3-ethyl-5-methyl-4-maleimidephenyl) methane, purchased from K. I Chemicals.

BMI-80: Bisphenol A diphenyl ether bismaleimide, purchased from K. I Chemicals.

BMI-2300: Polyphenylmethane maleimide, purchased from Daiwa Chemical Co., Ltd.

BMI-1000: 4,4'-diphenylmethane bismaleimide, purchased from Daiwa Chemical Co., Ltd.

BMI-3000: Maleimide resin of formula (1), purchased from Designer Molecular Inc.

BMI-1700: Maleimide resin of formula (2), purchased from Designer Molecular Inc.

BMI-2500: Maleimide resin of formula (3), purchased from Designer Molecular Inc.

BMI-1500: Maleimide resin of formula (4), purchased from Designer Molecular Inc.

TAIC: Triallyl isocyanurate, commercially available.

SC-2050 SVJ: spherical silica, purchased from Admatechs.

25B: 2,5-dimethyl-2,5-di(tert-butylperoxy)-3-hexyne, purchased from NOF Co.

Mixed solvent 1: a mixed solvent of toluene and methyl ethyl ketone (MEK), in which the weight ratio of toluene to methyl ethyl ketone is 4:1, which is self-prepared.

Mixed solvent 2: a mixed solvent of anisole and methyl ethyl ketone (MEK), in which the weight ratio of anisole to methyl ethyl ketone is 4:1, which is self-prepared.

The preparation embodiments of the maleimide pre-polymerized resin numbered 1 to 14 of the present invention are shown in Table 1:

TABLE 1

Preparation embodiments of maleimide pre-polymerized resin numbered 1 to 14 of the present invention

| Number | Parts by weight ratio | Preparation method |
|---|---|---|
| 1 | BMI-70:BMI-3000 = 1:5 | After 10 g BMI-70 is dissolved in 40 g methyl ethyl ketone, 150 g toluene is added and stirred continually, then 50 g BMI-3000 and 0.3 g 25B are added, and reacted at 130° C. for 60 minutes, the maleimide pre-polymerized resin numbered 1 is obtained, and its solid content was 60%. |
| 2 | BMI-70:BMI-1700 = 1:5 | Same as number 1, only change BMI-3000 to BMI-1700. |
| 3 | BMI-70:BMI-2500 = 1:5 | After 10 g BMI-70 is dissolved in 40 g methyl ethyl ketone, then 150 g toluene is added and stirred continually, then 50 g BMI-2500 and 0.3 g 25B are added, and reacted at 130° C. for 60 minutes, the maleimide pre-polymerized resin numbered 3 was obtained, and its solid content was 60%. |
| 4 | BMI-70:BMI-1500 = 1:5 | Same as number 1, only change BMI-3000 to BMI-1500. |
| 5 | BMI-80:BMI-3000 = 1:5 | Same as number 1, only change BMI-70 to BMI-80. |
| 6 | BMI-2300:BMI-3000 = 1:5 | Same as number 1, only change BMI-70 to BMI-2300. |
| 7 | BMI-1000:BMI-3000 = 1:5 | Same as number 1, only change BMI-70 to BMI-1000. |
| 8 | BMI-70:BMI-3000 = 1:4 | After 10 g BMI-70 is dissolved in 40 g methyl ethyl ketone, then 150 g toluene is added and stirred continually, then 40 g BMI-3000 and 0.3 g 25B are added, and reacted at 130° C. for 60 minutes, the maleimide pre-polymerized resin numbered 8 is obtained, and its solid content was 60%. |

TABLE 1-continued

Preparation embodiments of maleimide pre-polymerized resin numbered 1 to 14 of the present invention

| Number | Parts by weight ratio | Preparation method |
|---|---|---|
| 9 | BMI-70:BMI-3000 = 1:3 | After 10 g BMI-70 is dissolved in 40 g methyl ethyl ketone, then 120 g toluene is added and stirred continually, then 30 g BMI-3000 and 0.2 g 25B are added, and reacted at 130° C. for 60 minutes, the maleimide pre-polymerized resin numbered 9 is obtained, and its solid content was 60%. |
| 10 | BMI-70:BMI-80:BMI-2300:BMI-1000:BMI-3000 = 1:1:1.5:1.5:25 | After 2 g BMI-70, 2 g BMI-80, 3 g BMI-2300, and 3 g BMI-1000 are dissolved in 40 g methyl ethyl ketone, then 150 g toluene is added and stirred continually, then 50 g BMI-3000 and 0.3 g 25B are added, and reacted at 130° C. for 60 minutes, the maleimide pre-polymerized resin numbered 10 is obtained, and its solid content was 60%. |
| 11 | BMI-70:BMI-3000 = 1:1 | After 10 g BMI-70 is dissolved in 40 g methyl ethyl ketone, then 120 g toluene is added and stirred continually, then 10 g BMI-3000 and 0.1 g 25B are added, and reacted at 130° C. for 60 minutes, the maleimide pre-polymerized resin numbered 11 is obtained, and its solid content was 60%. |
| 12 | BMI-70:BMI-3000 = 1:7 | After 10 g BMI-70 is dissolved in 40 g methyl ethyl ketone, then 200 g toluene is added and stirred continually, then 70g BMI-3000 and 0.4 g 25B are added, and reacted at 130° C. for 60 minutes, the maleimide pre-polymerized resin numbered 12 is obtained, and its solid content was 60%. |
| 13 | BMI-70:BMI-80 = 1:5 | Same as number 1, only change BMI-3000 to BMI-80. |
| 14 | BMI-1700:BMI-3000 = 1:5 | Same as number 1, only change BMI-70 to BMI-1700. |

Taking the maleimide pre-polymerized resin numbered 1 as an example, the weight ratio of BMI-70: BMI-3000 is 1:5, and the preparation method is that: 10 g BMI-70 is dissolved in 40 g methyl ethyl ketone, then 150 g toluene is added and stirred continually, then 50 g BMI-3000 and 0.3 g 25B are added, and reacted at 130° C. for 60 minutes to obtain the maleimide pre-polymerized resin numbered 1 with a solid content of 60%, The conversion rate of maleimide pre-polymerized resin numbered 1 is between 10% and 90%. Please refer to Table 1 for the preparation methods of maleimide pre-polymerized resins numbered 2 to 14. Among them, the maleimide pre-polymerized resins numbered 1 to 10 are used to prepare the embodiments of resin composition comprising maleimide-containing pre-polymerized resin and article made therefrom, and the maleimide pre-polymerized resins numbered 1, 11-14 are used to prepare the comparative example of the present invention. The conversion rate of maleimide pre-polymerized resins numbered 2-10 is also between 10% and 90%.

The ingredients (parts by weight) of embodiments E1 to E16 of the resin composition comprising maleimide-containing pre-polymerized resin of the present invention are shown in Table 2-1 and Table 2-2:

TABLE 2-1

Ingredients (parts by weight) of Examples E1 to E8 of the resin composition comprising maleimide-containing pre-polymerized resin of the present invention

| Ingredients | Names | E1 | E2 | E3 | E4 | E5 | E6 | E7 | E8 |
|---|---|---|---|---|---|---|---|---|---|
| Maleimide pre-polymerized resin | Number 1 | 42 | 30 | 60 | | | | | |
| | Number 2 | | | | | | 42 | | |
| | Number 3 | | | | | | | | |
| | Number 4 | | | | | | | | |
| | Number 5 | | | | | | | 42 | |
| | Number 6 | | | | | | | | 42 |
| | Number 7 | | | | | | | | |
| | Number 8 | | | | 42 | | | | |
| | Number 9 | | | | | 42 | | | |
| | Number 10 | | | | | | | | |
| | Number 11 | | | | | | | | |
| | Number 12 | | | | | | | | |
| | Number 13 | | | | | | | | |
| | Number 14 | | | | | | | | |
| Maleimide resin | BMI-70 | | | | | | | | |
| | BMI-80 | | | | | | | | |
| | BMI-2300 | | | | | | | | |
| | BMI-1000 | | | | | | | | |
| | BMI-3000 | | | | | | | | |
| | BMI-1700 | | | | | | | | |
| | BMI-1500 | | | | | | | | |

TABLE 2-1-continued

Ingredients (parts by weight) of Examples E1 to E8 of the resin composition comprising maleimide-containing pre-polymerized resin of the present invention

| Ingredients | Names | E1 | E2 | E3 | E4 | E5 | E6 | E7 | E8 |
|---|---|---|---|---|---|---|---|---|---|
| Vinyl-containing polyphenylene ether resin | SA9000 | 20 | 20 | 20 | 20 | 20 | 20 | 20 | 20 |
| | OPE-2st-2200 | 65 | 65 | 65 | 65 | 65 | 65 | 65 | 65 |
| | OPE-2st-1200 | 15 | 15 | 15 | 15 | 15 | 15 | 15 | 15 |
| Bis(vinylphenyl)ethane | BVPE | 40 | 40 | 40 | 40 | 40 | 40 | 40 | 40 |
| Crosslinking agent | TAIC | 8 | 8 | 8 | 8 | 8 | 8 | 8 | 8 |
| Inorganic filler | SC-2050 SVJ | 70 | 70 | 70 | 70 | 70 | 70 | 70 | 70 |
| Curing accelerator | 25B | 0.02 | 0.02 | 0.02 | 0.02 | 0.02 | 0.02 | 0.02 | 0.02 |
| Mixed solvent 1 | Toluene/MEK = 4:1 | 150 | 150 | 150 | 150 | 150 | 150 | 150 | 150 |
| Mixed solvent 2 | Anisole/MEK = 4:1 | | | | | | | | |

TABLE 2-2

Ingredients (parts by weight) of Examples E9 to E16 of the resin composition comprising maleimide-containing pre-polymerized resin of the present invention

| Ingredients | Names | E9 | E10 | E11 | E12 | E13 | E14 | E15 | E16 |
|---|---|---|---|---|---|---|---|---|---|
| Maleimide pre-polymerized resin | Number 1 | 44 | 42 | 42 | | | 42 | | |
| | Number 2 | | | | | | | | |
| | Number 3 | | | | | 42 | | | |
| | Number 4 | | | | | | | 42 | |
| | Number 5 | | | | | | | | |
| | Number 6 | | | | | | | | |
| | Number 7 | | | | 42 | | | | |
| | Number 8 | | | | | | | | |
| | Number 9 | | | | | | | | |
| | Number 10 | | | | | | | | 42 |
| | Number 11 | | | | | | | | |
| | Number 12 | | | | | | | | |
| | Number 13 | | | | | | | | |
| | Number 14 | | | | | | | | |
| Maleimide resin | BMI-70 | | | | | | | | |
| | BMI-80 | | | | | | | | |
| | BMI-2300 | | | | | | | | |
| | BMI-1000 | | | | | | | | |
| | BMI-3000 | | | | | | | | |
| | BMI-1700 | | | | | | | | |
| | BMI-1500 | | | | | | | | |
| Vinyl-containing polyphenylene ether resin | SA9000 | 15 | 20 | 20 | 20 | 20 | 20 | 20 | 20 |
| | OPE-2st-2200 | 75 | 65 | 65 | 65 | 65 | 65 | 65 | 65 |
| | OPE-2st-1200 | 10 | 15 | 15 | 15 | 15 | 15 | 15 | 15 |
| Bis(vinylphenyl)ethane | BVPE | 42 | 35 | 45 | 40 | 40 | 40 | 40 | 40 |
| Crosslinking agent | TAIC | 12 | 8 | 8 | 8 | 8 | | 8 | 8 |
| Inorganic filler | SC-2050 SVJ | 75 | 70 | 70 | 70 | 70 | 70 | 70 | 70 |
| Curing accelerator | 25B | 0.035 | 0.02 | 0.02 | 0.02 | 0.02 | 0.02 | 0.02 | 0.02 |
| Mixed solvent 1 | Toluene/MEK = 4:1 | 145 | 150 | 150 | 150 | | 150 | 150 | 150 |
| Mixed solvent 2 | Anisole/MEK = 4:1 | | | | | 150 | | | |

Taking embodiment E1 of the resin composition comprising maleimide-containing pre-polymerized resin as an example, the ingredients are: 42 parts by weight of the maleimide pre-polymerized resin numbered 1 in Table 1, 100 parts by weight of vinyl-containing polyphenylene ether resin (containing 20 parts by weight of SA9000, 65 parts by weight of OPE-2st-2200 and 15 parts by weight of OPE-2st-1200), 40 parts by weight of bis(vinylphenyl)ethane (BVPE), 8 parts by weight of crosslinking agent (TAIC), 70 parts by weight of inorganic filler (SC-2050 SVJ), 0.02 part by weight of curing accelerator (25B) and 150 parts by weight of mixed solvent 1 (The weight ratio of toluene and methyl ethyl ketone is 4:1). The ingredients of the remaining embodiments E2 to E16 are clearly disclosed in Table 2-1 and Table 2-2. Furthermore, Embodiments E1 to E16 are prepared using maleimide pre-polymerized resins numbered 1-10 in Table 1.

The ingredients (parts by weight) of comparative examples C1 to C14 of the present invention are shown in Table 3-1 and Table 3-2:

TABLE 3-1

Ingredients (parts by weight) of comparative examples C1 to C7 of the present invention

| Ingredients | Names | C1 | C2 | C3 | C4 | C5 | C6 | C7 |
|---|---|---|---|---|---|---|---|---|
| Maleimide pre-polymerized resin | Number 1 | | 10 | 80 | | | | |
| | Number 2 | | | | | | | |
| | Number 3 | | | | | | | |
| | Number 4 | | | | | | | |
| | Number 5 | | | | | | | |
| | Number 6 | | | | | | | |
| | Number 7 | | | | | | | |
| | Number 8 | | | | | | | |
| | Number 9 | | | | | | | |
| | Number 10 | | | | | | | |
| | Number 11 | | | | | 42 | | |
| | Number 12 | | | | | | 42 | |
| | Number 13 | | | | | | | |
| | Number 14 | | | | | | | |
| Maleimide resin | BMI-70 | 7 | | | | | 7 | |
| | BMI-80 | | | | | | | 7 |
| | BMI-2300 | | | | | | | |
| | BMI-1000 | | | | | | | |
| | BMI-3000 | 35 | | | | | | 35 |
| | BMI-1700 | | | | | | 35 | |
| | BMI-1500 | | | | | | | |
| Vinyl-containing polyphenylene ether resin | SA9000 | 20 | 20 | 20 | 20 | 20 | 20 | 20 |
| | OPE-2st-2200 | 65 | 65 | 65 | 65 | 65 | 65 | 65 |
| | OPE-2st-1200 | 15 | 15 | 15 | 15 | 15 | 15 | 15 |
| Bis(vinylphenyl)ethane | BVPE | 40 | 40 | 40 | 40 | 40 | 40 | 40 |
| Crosslinking agent | TAIC | 8 | 8 | 8 | 8 | 8 | 8 | 8 |
| Inorganic filler | SC-2050 SVJ | 70 | 70 | 70 | 70 | 70 | 70 | 70 |
| Curing accelerator | 25B | 0.02 | 0.02 | 0.02 | 0.02 | 0.02 | 0.02 | 0.02 |
| Mixed solvent 1 | Toluene/MEK = 4:1 | 150 | 150 | 150 | 150 | 150 | 150 | 150 |
| Mixed solvent 2 | Anisole/MEK = 4:1 | | | | | | | |

TABLE 3-2

Ingredients (parts by weight) of comparative examples C8 to C14 of the present invention

| Ingredients | Names | C8 | C9 | C10 | C11 | C12 | C13 | C14 |
|---|---|---|---|---|---|---|---|---|
| Maleimide pre-polymerized resin | Number 1 | | 42 | 42 | | | | |
| | Number 2 | | | | | | | |
| | Number 3 | | | | | | | |
| | Number 4 | | | | | | | |
| | Number 5 | | | | | | | |
| | Number 6 | | | | | | | |
| | Number 7 | | | | | | | |
| | Number 8 | | | | | | | |
| | Number 9 | | | | | | | |
| | Number 10 | | | | | | | |
| | Number 11 | | | | | | | |
| | Number 12 | | | | | | 42 | |
| | Number 13 | | | | | | 42 | |
| | Number 14 | | | | | | | 42 |

TABLE 3-2-continued

Ingredients (parts by weight) of comparative examples C8 to C14 of the present invention

| Ingredients | Names | C8 | C9 | C10 | C11 | C12 | C13 | C14 |
|---|---|---|---|---|---|---|---|---|
| Maleimide resin | BMI-70 | | | | | | | 7 |
| | BMI-80 | | | | | | | |
| | BMI-2300 | 7 | | | | | | |
| | BMI-1000 | | | | | | 7 | |
| | BMI-3000 | 35 | | | | | 35 | |
| | BMI-1700 | | | | | | | |
| | BMI-1500 | | | | | | | 35 |
| Vinyl-containing polyphenylene ether resin | SA9000 | 20 | 20 | 20 | 20 | 20 | 20 | 20 |
| | OPE-2st-2200 | 65 | 65 | 65 | 65 | 65 | 65 | 65 |
| | OPE-2st-1200 | 15 | 15 | 15 | 15 | 15 | 15 | 15 |
| Bis(vinylphenyl)ethane | BVPE | 40 | 5 | 60 | 40 | 40 | 40 | 40 |
| Crosslinking agent | TAIC | 8 | 8 | 8 | 8 | 8 | 8 | 8 |
| Inorganic filler | SC-2050 SVJ | 70 | 70 | 70 | 70 | 70 | 70 | 70 |
| Curing accelerator | 25B | 0.02 | 0.02 | 0.02 | 0.02 | 0.02 | 0.02 | 0.02 |
| Mixed solvent 1 | Toluene/MEK = 4:1 | 150 | 150 | 150 | 150 | 150 | 150 | 150 |
| Mixed solvent 2 | Anisole/MEK = 4:1 | | | | | | | |

Taking comparative example C1 as an example, the ingredients of the resin composition are: 42 parts by weight of maleimide resin (containing 7 parts by weight of BMI-70 and 35 parts by weight of BMI-3000), 100 parts by weight of vinyl-containing polyphenylene ether resin (containing 20 parts by weight of SA9000, 65 parts by weight of OPE-2st-2200 and 15 parts by weight of OPE-2st-1200), 40 parts by weight of bis(vinylphenyl)ethane (BVPE), 8 parts by weight of crosslinking agent (TAIC), 70 parts by weight of inorganic filler (SC-2050 SVJ), 0.02 part by weight of curing accelerator (25B) and 150 parts by weight of mixed solvent 1 (The weight ratio of toluene and methyl ethyl ketone is 4:1). The ingredients of the remaining embodiments C2 to C14 are clearly disclosed in Table 3-1 and Table 3-2.

The preparation methods for the embodiments of the article of resin composition comprising maleimide-containing pre-polymerized resin or the article of the comparative examples in the present invention are as follows:

1. Prepreg:
    In the embodiments E1 to E16 of the resin composition comprising maleimide-containing pre-polymerized resin (listed in Table 2-1 and Table 2-2) or the comparative examples C1 to C14 of the resin compositions (listed in Table 3-1 and Table 3-2), the various chemical reagents in the resin composition are uniformly mixed to form a varnish, and the varnish is placed in the impregnation tank, and then fiberglass fabric (for example, 1078 L-glass fiber fabric, purchased from Asahi) is immersed in the above-mentioned impregnation tank, the resin composition is attached to the fiberglass fabric, and is heated to a semi-cured state (B-Stage) at 130° C. to 150° C. to obtain a prepreg with a resin content of about 70%.
2. A copper-containing laminate formed by laminating six prepregs:
    Prepare two 0.5-ounce HVLP (hyper very low profile) copper foils and six of the above prepregs, and stack them in the order of one copper foil, six prepregs, and another one copper foil. In a vacuum, the laminating pressure is 400 psi to 600 psi and at a temperature of 190° C. to 210° C., laminate it for 120 minutes to 180 minutes to obtain a copper-containing laminate (formed by laminating six prepregs). The six stacked prepregs are cured to form an insulating layer between the two copper foils. The resin content of the insulating layer is about 70%.
3. A copper-containing laminate formed by laminating eight prepregs:
    Prepare two 0.5-ounce HVLP (hyper very low profile) copper foils and eight of the above prepregs, and stack them in the order of one copper foil, eight prepregs and another one copper foil. In a vacuum, the laminating pressure is 400 psi to 600 psi and at a temperature of 190° C. to 210° C., laminate it for 120 minutes to 180 minutes to obtain a copper-containing laminate (formed by laminating eight prepregs). Eight stacked prepregs are cured to form an insulating layer between the two copper foils. The resin content of the insulating layer is about 70%.
4. The copper-free laminate (it formed by laminating the above six prepregs, which is used in the measurement of the articles of the present invention):
    The above-mentioned copper-containing laminate formed by laminating six prepregs is etched to remove the copper foil on both sides thereof to obtain a copper-free laminate (formed by laminating the six prepregs).
5. The copper-free laminate (it formed by laminating eight prepregs, which is used in the measurement of the article of the present invention):
    The copper-containing laminate formed by laminating the above eight prepregs is etched to remove the copper foil on both sides thereof to obtain a copper-free laminate (formed by laminating the eight prepregs).

Figure 2:
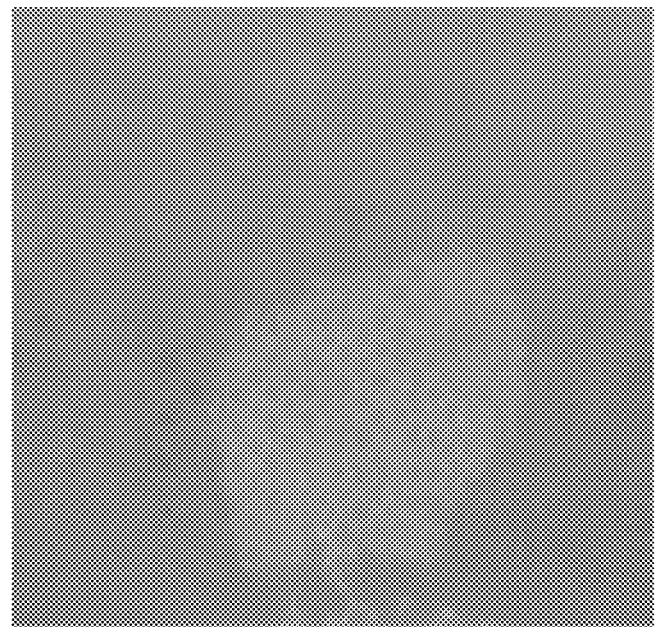
FIG. 2 shows the phenomenon of the dry board and the weave pattern, and the test result is "NG".

The test methods of the articles of the embodiments of the resin composition comprising maleimide-containing pre-polymerized resin or the articles of the comparative examples in the present invention are as follows:

1. Glass transition temperature variation:
    Prepare a copper-free laminate (formed by laminating six prepregs), and take two samples at adjacent positions on the copper-free laminate (the distance between the both is about 1 to 2 cm), and each sample is cut into a width of 1.2 cm for a rectangular sample with a length of 3.5 cm, use dynamic mechanical analysis (DMA) and refer to the method described in IPC-TM-650 2.4.24.4 to measure two samples to be tested, one of which is at room temperature (approximately 25° C.) to measure the glass transition temperature (unit: ° C.) to obtain Tg1. Place another sample to be tested under 85° C. and 85% relative humidity (RH), and place it for 168 hours to measure the glass transition temperature (unit: ° C.) to obtain Tg2. Generally speaking, the margin of error of Tg1 and Tg2 measured by DMA instrument is about ±1° C. The glass transition temperature variation (ΔTg) is defined as the difference between Tg1 and Tg2, for example, ΔTg=Tg1−Tg2. In the technical field to which the present disclosure pertains, smaller glass transition temperature variation is better Generally speaking, the glass transition temperature variation of greater than or equal to 3° C. represents a significant difference.
2. The copper foil peeling strength (0.5 ounce, Hoz peeling strength, Hoz P/S)
    A copper-free laminate (formed by laminating six prepregs) is prepared, it is cut into a rectangular sample with a width of 24 mm and a length of 80 mm, and the copper foil is etched on the surface, only one long strip copper foil with a width of 3.18 mm and a length of more than 60 mm is kept, a universal tensile strength testing machine is used at room temperature (about 25° C.) according to the method described in IPC-TM-650 2.4.8 to measure, and 0.5 ounce (half-ounce) of the copper foil peeling strength (Hoz P/S) is used, its unit is lb/in. In the technical field to which the present disclosure pertains, higher copper foil peeling strength is better Generally speaking, when the copper foil peeling strength is 0.5 ounce and the resin content is about 70%, a difference of greater than or equal to 0.3 lb/represents a significant difference.
3. Percentage of thermal expansion (PTE)
    In the measurement of the percentage of thermal expansion (measurement in the Z-axis direction), a copper-free laminate (formed by laminating eight prepregs) is selected as the sample to be tested for thermal mechanical analysis (TMA), and the sample is cut into a square sample with a width of 7 mm and a length of 7 mm. The sample is heated at a raising rate of 10° C. per minute, from 35° C. to 270° C. in the temperature range, the method described in IPC-TM-650 2.4.24.5 is referred to measure each sample to be tested for the Z-axis percentage of thermal expansion (unit: %) at 50° C. to 260° C. In the technical field to which the present disclosure pertains, lower percentage of thermal expansion is better Generally speaking, when a difference for the Z-axis percentage of thermal expansion of greater than or equal to 0.3% represents a significant difference.
4. Coefficient of thermal expansion (CTE)
    In the measurement of the coefficient of thermal expansion (measurement in the Z-axis direction), a copper-free laminate (formed by laminating eight prepregs) is selected as the sample to be tested, and the sample is cut into a square sample with a width of 7 mm and a length of 7 mm. The sample is heated at a raising rate of 10° C. per minute, from 35° C. to 270° C. in the temperature range, a thermal mechanical analyzer (TMA) is used, the IPC-TM-650 2.4.24.5 method is referred to measure the Z-axis coefficient of thermal expansion (α1) of each sample in the temperature range from 50° C. to 110° C., and its unit is ppm/° C. In the technical field to which the present disclosure pertains, lower coefficient of thermal expansion is better Generally speaking, a difference for the Z-axis coefficient of thermal expansion of greater than or equal to 5 ppm/° C. represents a significant difference.
5. Appearance of the substrate
    Choose a copper-free laminate (formed by laminating eight prepregs), and visually observe whether there are any phenomenon of dry boards and textures on the surface of the insulating layer. If there is non-dry board and non-weave appearance, it means that the appearance of the laminate is normal (as shown in FIG. 1), and it will indicate "OK" in the test result. If the phenomenon of dry board and weaves appear (as shown in FIG. 2), it is marked as "NG".

According to the above test method, the test results for the articles of embodiments E1 to E16 of the resin composition comprising maleimide-containing pre-polymerized resin and comparative examples C1 to C14 in the present invention, are respectively shown in Table 4-1 and Table 4-2, and Table 5-1 and Table 5-2.

TABLE 4-1

Test results for embodiments E1 to E8 of the resin composition comprising maleimide-containing pre-polymerized resin of the present invention applied to articles

| Characteristics | Units | E1 | E2 | E3 | E4 | E5 | E6 | E7 | E8 |
|---|---|---|---|---|---|---|---|---|---|
| Tg1 | ° C. | 200 | 193 | 196 | 202 | 203 | 201 | 201 | 203 |
| Tg2 | ° C. | 200 | 192 | 194 | 200 | 201 | 200 | 200 | 202 |
| ΔTg | ° C. | 0 | 1 | 2 | 2 | 2 | 1 | 1 | 1 |
| Hoz P/S | lb/in | 3.3 | 3.4 | 3.2 | 3.3 | 3.2 | 3.3 | 3.3 | 3.2 |
| Z-PTE | % | 2.4 | 2.4 | 2.5 | 2.4 | 2.4 | 2.4 | 2.4 | 2.4 |
| Z-CTE | ppm/° C. | 40 | 38 | 45 | 38 | 37 | 39 | 42 | 35 |
| Substrate appearance | | OK | OK | OK | OK | OK | OK | OK | OK |

TABLE 4-2

Test results for embodiments E9 to E16 of the resin composition comprising maleimide-containing pre-polymerized resin of the present invention applied to articles

| Characteristics | Units | E9 | E10 | E11 | E12 | E13 | E14 | E15 | E16 |
|---|---|---|---|---|---|---|---|---|---|
| Tg1 | °C. | 201 | 197 | 203 | 199 | 201 | 202 | 201 | 201 |
| Tg2 | °C. | 201 | 196 | 201 | 197 | 200 | 202 | 200 | 200 |
| ΔTg | °C. | 0 | 1 | 2 | 2 | 1 | 0 | 1 | 1 |
| Hoz P/S | lb/in | 3.5 | 3.3 | 3.2 | 3.2 | 3.2 | 3.3 | 3.3 | 3.4 |
| Z-PTE | % | 2.3 | 2.5 | 2.4 | 2.4 | 2.4 | 2.3 | 2.4 | 2.5 |
| Z-CTE | ppm/°C. | 35 | 43 | 41 | 39 | 38 | 39 | 40 | 41 |
| Substrate appearance | | OK | OK | OK | OK | OK | OK | OK | OK |

TABLE 5-1

Test results for comparative examples C1 to C7 of the present invention applied to articles

| Characteristics | Units | C1 | C2 | C3 | C4 | C5 | C6 | C7 |
|---|---|---|---|---|---|---|---|---|
| Tg1 | °C. | 199 | 193 | 196 | 208 | 198 | 201 | 198 |
| Tg2 | °C. | 189 | 186 | 194 | 201 | 192 | 190 | 186 |
| ΔTg | °C. | 10 | 7 | 2 | 7 | 6 | 11 | 12 |
| Hoz P/S | lb/in | 2.4 | 3.5 | 2.8 | 2.8 | 3.4 | 2.2 | 2.3 |
| Z-PTE | % | 3.1 | 2.4 | 3.3 | 2.5 | 2.9 | 2.8 | 2.8 |
| Z-CTE | ppm/°C. | 57 | 40 | 62 | 44 | 54 | 52 | 54 |
| Substrate appearance | | NG | OK | OK | NG | OK | NG | NG |

TABLE 5-2

Test results for comparative examples C8 to C14 of the present invention applied to articles

| Characteristics | Units | C8 | C9 | C10 | C11 | C12 | C13 | C14 |
|---|---|---|---|---|---|---|---|---|
| Tg1 | °C. | 204 | 175 | 214 | 224 | 193 | 188 | 201 |
| Tg2 | °C. | 192 | 168 | 212 | 210 | 186 | 178 | 192 |
| ΔTg | °C. | 12 | 7 | 2 | 14 | 7 | 10 | 9 |
| Hoz P/S | lb/in | 2.2 | 3.5 | 2.6 | 2.1 | 3.3 | 2.3 | 2.3 |
| Z-PTE | % | 2.8 | 2.7 | 2.2 | 2.2 | 2.9 | 2.8 | 2.9 |
| Z-CTE | ppm/°C. | 56 | 50 | 35 | 37 | 56 | 53 | 58 |
| Substrate appearance | | NG | OK | OK | NG | OK | NG | NG |

In Table 4-1 and Table 4-2, embodiments E1 to E16 of the resin composition comprising maleimide-containing pre-polymerized resin of the present invention are applied to the articles, and all can achieve the glass transition temperature variation of less than or equal to 3° C., the copper foil peeling strength of greater than or equal to 3.2 lb/in, percentage of thermal expansion of less than or equal to 2.5%, coefficient of thermal expansion of less than or equal to 45 ppm/° C., and the surface appearance has no phenomenon of dry board and texture.

The embodiments E1 to E16 are compared, if the maleimide pre-polymerized resin of the present invention is not used in the resin composition, for example, comparative examples C1, C6 to C8, C13, C14, or the maleimide pre-polymerized resin of the present invention is used, but the addition amount is not within the range of 30 parts by weight to 60 parts by weight, for example, comparative examples C2 and C3, or the maleimide pre-polymerized resin obtained by pre-polymerization of aromatic maleimide resin and long-chain type maleimide resin according to the present invention is not used, such as comparative examples C4 and C5, they can't meet the requirements in at least one of the characteristics of glass transition temperature variation, copper foil peeling strength, percentage of thermal expansion, and coefficient of thermal expansion.

The embodiments E1 to E16 are compared, if the addition amount of bis(vinylphenyl)ethane in the resin composition is not within the range of 35 parts by weight to 45 parts by weight, for example, comparative examples C9 and C10, in at least one of the characteristics of glass transformation temperature variation, copper foil peeling strength, and the coefficient of thermal expansion cannot meet the requirements.

The embodiments E1 to E16 are compared, if the weight ratio of the aromatic maleimide resin and the long-chain maleimide resin of the maleimide pre-polymerized resin in the resin composition is not within the range of 1:3 to 1:5, such as comparative examples C11 and C12, at least one of the characteristics of glass transition temperature variation, copper foil peeling strength, percentage of thermal expansion, coefficient of thermal expansion, and the surface appearance can't meet the requirements.

The resin composition comprising maleimide-containing pre-polymerized resin and article made therefrom of the present invention are formed by pre-polymerization the aromatic maleimide resin and the long-chain maleimide resin to form the maleimide pre-polymerized resin, and appropriate parts by weight is matched thereof, and then vinyl-containing polyphenylene ether resin and bis(vinylphenyl) ethane are added into thereof to form a resin composition comprising maleimide-containing pre-polymerized resin and article, which can improve at least one of the characteristics of glass transition temperature variation, copper foil peeling strength, percentage of thermal expansion, coefficient of thermal expansion and surface appearance.

In addition, although at least one illustrative embodiment or comparative example is proposed in the foregoing implementation, it should be understood that the present invention may still have a lot of changes. It should also be understood that the embodiments described herein are not intended to limit the scope, use, or configuration of the requested subject matter in any way. On the contrary, the foregoing embodiments will provide a convenient guide for a person having ordinary skill in the art to implement one or more of the described embodiments. Furthermore, various changes can be made to the function and arrangement of the components without departing from the scope defined by the claims of the patent application, and the claims of the patent application includes known equivalents and all foreseeable equivalents at the filing time of this patent application.

What is claimed is:

1. A resin composition comprising maleimide-containing pre-polymerized resin comprising:
   100 parts by weight of vinyl-containing polyphenylene ether resin;
   35 to 45 parts by weight of bis(vinylphenyl) ethane; and
   30 parts by weight to 60 parts by weight of maleimide pre-polymerized resin;
   wherein the maleimide pre-polymerized resin is a pre-polymer obtained by pre-polymerization of aromatic maleimide resin and long-chain maleimide resin, and wherein the long-chain maleimide resin comprises a structure shown in any one of formula (1) to formula (4);

formula (1)

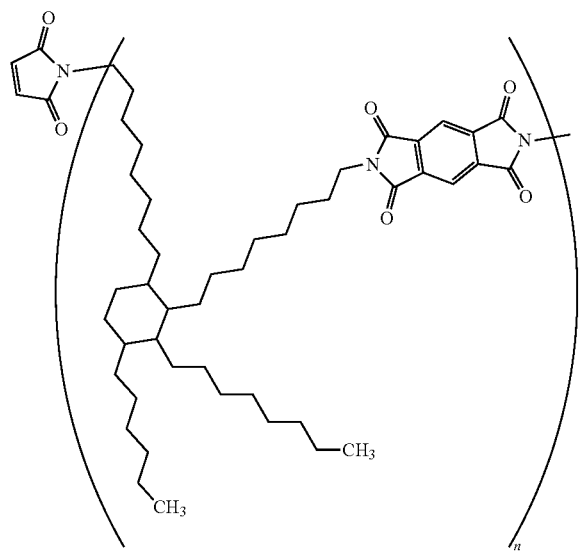

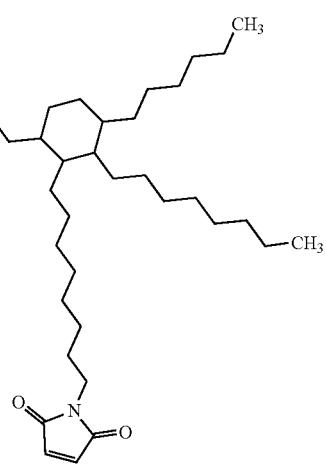

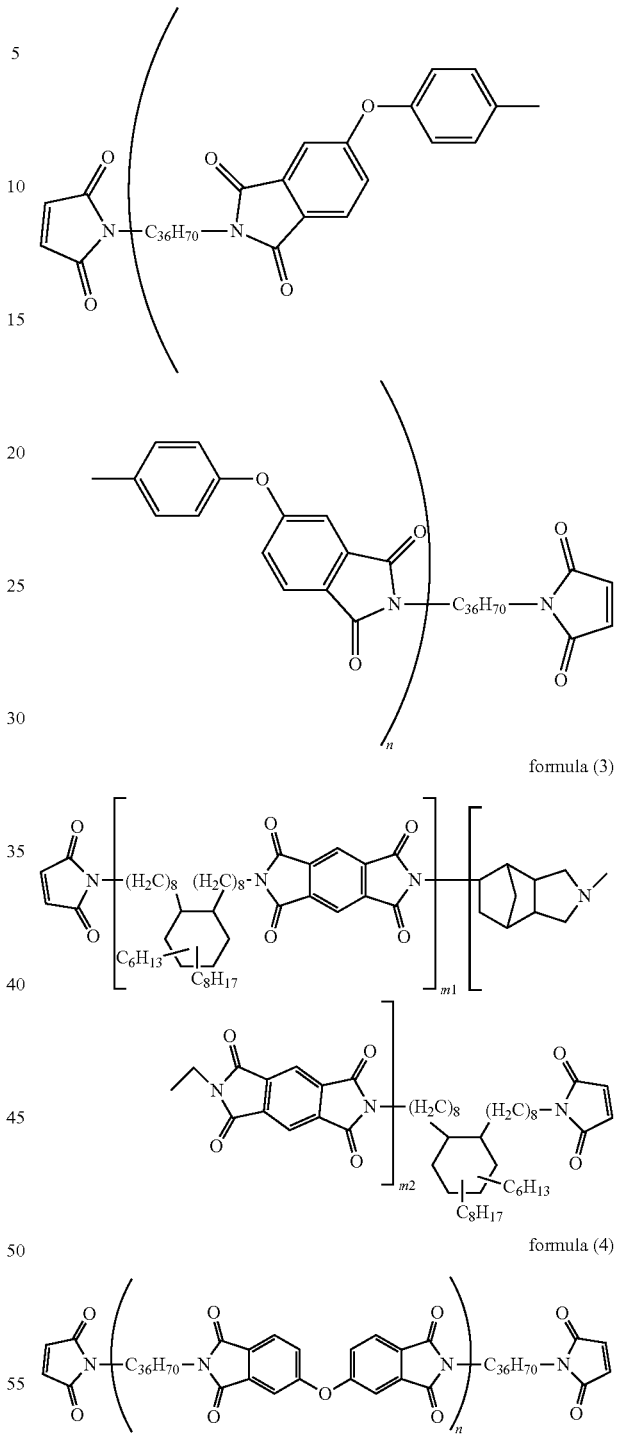

wherein, in formula (1) and formula (2), n is an integer from 1 to 10 respectively; in formula (3), m1 is an integer from 1 to 5, and m2 is an integer from 1 to 5; in formula (4), n is an integer from 1 to 3; and
wherein the weight ratio of the aromatic maleimide resin to the long-chain maleimide resin is 1:3 to 1:5.

2. The resin composition comprising maleimide-containing pre-polymerized resin according to claim 1, wherein the vinyl-containing polyphenylene ether resin comprises methacrylate-containing polyphenylene ether resin, vinylbenzyl-containing biphenyl polyphenylene ether resin, vinylbenzyl-containing bisphenol A polyphenylene ether resin, chain-extended vinyl-containing polyphenylene ether resin, or a combination thereof.

3. The resin composition comprising maleimide-containing pre-polymerized resin according to claim 1, wherein the aromatic maleimide resin comprises bis (3-ethyl-5-methyl-4-maleimidephenyl) methane, bisphenol A diphenyl ether bismaleimide, polyphenylmethane maleimide and 4,4'-diphenylmethane bismaleimide, or a combination thereof.

4. The resin composition comprising maleimide-containing pre-polymerized resin according to claim 1, further comprising flame retardant, crosslinking agent, inorganic filler, curing accelerator, solvent, polymerization inhibitor, silane coupling agent, coloring agent, toughening agent, core-shell rubber or a combination thereof.

5. An article of the resin composition comprising maleimide-containing pre-polymerized resin according to claim 1, comprising: resin film, prepreg, laminate or printed circuit board.

6. The article of the resin composition comprising maleimide-containing pre-polymerized resin according to claim 5, being measured with reference to the method described in IPC-TM-650 2.4.24.4, and its glass transition temperature variation being less than or equal to 3° C.

7. The article of the resin composition comprising maleimide-containing pre-polymerized resin according to claim 5, being measured with reference to the method described in IPC-TM-650 2.4.8, and its copper foil peeling strength being greater than or equal to 3.2 lb/in.

8. The article of the resin composition comprising maleimide-containing pre-polymerized resin according to claim 5, being measured with reference to the method described in IPC-TM-650 2.4.24.5, and its Z-axis percentage of thermal expansion being less than or equal to 2.5%.

9. The article of the resin composition comprising maleimide-containing pre-polymerized resin according to claim 5, being measured with reference to the method described in IPC-TM-650 2.4.24.5, and its Z axis coefficient of thermal expansion being less than or equal to 45 ppm/° C.

* * * * *